Patented Aug. 14, 1951

2,564,194

UNITED STATES PATENT OFFICE 2,564,194

STABILIZATION OF HIGH MOLECULAR WEIGHT ORGANIC MATERIAL CONTAINING INORGANIC ACID-FORMING ELEMENTS

Willem Leendert Johannes de Nie, Englewood, N. J., and Heino Tonnis Voorthuis, Amsterdam, Netherlands, assignors to Shell Development Company, Emeryville, Calif., a corporation of Delaware No Drawing. Application March 2, 1951, Serial No. 213,671. In the Netherlands September 26, 1946

10 Claims. (Cl. 260—45.8)

This invention relates to the stabilization of high molecular weight organic material containing inorganic acid-forming elements. More particularly the invention provides organic polymer compositions which have been rendered resistant to the changes in properties that are characteristic of such compositions without any substantial loss of transparency or moisture resistance. In its most specific embodiment the invention provides a method of inhibiting the formation of free inorganic acids within an organic mass by the thermo or photochemically induced decomposition of organic polymeric molecules to which are attached inorganic acid residues.

Organic polymers and other high molecular weight organic materials are becoming increasingly important in commercial applications. A large and important class of such substances are high molecular weight organic materials in which the residues of inorganic acids, as halogen atoms, the sulfate, phosphate, nitrate and similar groups are attached to one or more atoms of complex organic molecules. Illustrative examples of such materials are the halogenation products of fats, train oils, waxes and the high boiling hydrocarbons, such as naphthalene, diphenyl, and the normally solid paraffins; the polymers and copolymers of the vinyl halides, the vinylidene halides, the halogenated dienes, the vinyl halide acetates, the halogen acrylonitriles, the halogen methacrylonitriles and the further reaction products of the polymers and copolymers of such materials with the halogens; the reaction products of the polymers and copolymers of the alkenes with the halogens; the reaction products of the polyunsaturated compounds such as the natural rubbers, gutta percha, balata, polymerization and copolymerization products of the dienes, the acetylene hydrocarbons, the vinyl acetylene hydrocarbons and the diacetylene hydrocarbons, and including the derivatives of these hydrocarbons with the halogens, $SO_2$, $P_2O_3$, $N_2O_3$, $H_2S$ and the hydrogen halides and the like. These organic materials with which the invention is concerned have molecular weights of at least 162.

The problem of reducing the tendency of such materials to split off molecules of an inorganic acid corresponding to the acid radical attached to the organic material is both serious and difficult of solution. For example, in the case of the halogen containing vinyl resins, the most desirable fabrication techniques require that the plastic material withstand temperatures approaching 200° C. during molding and forming operations, and many of the most desirable applications of the formed plastic materials require that they withstand the effects of direct exposure to sunlight and moisture. In other words, the most important uses of the materials often require their resistance to change under the very conditions most liable to induce the complex molecules to disintegrate.

It has long been known that the incorporation of a substance capable of combining with the inorganic acid as it is formed in such composition greatly improves the stability of the composition. White lead or basic lead carbonate, for example, has been found to present a partial solution of the problem and because of its low cost has been so employed on a large scale. However, inorganic stabilizers such as white lead are not soluble in the organic materials and must be finely dispersed in the solid form throughout the mass of organic material. Their employment, therefore, prevents the formation of transparent compositions and is not applicable for other than compositions which remain in the solid state. Numerous organic substances have been proposed, but the vast majority do not approach white lead in their stabilizing efficiency; further, many of them are too volatile to remain in the composition for a sufficient period of time; many are themselves rapidly decomposed or discolored photochemically while others cause cross-linking between the polymer chains, thus changing the thermoplastic characteristics of the polymers in the composition.

Certain organic compounds containing an epoxide group have been found to be effective thermostabilizers for high temperatures over short periods of exposure. The compounds heretofore proposed which contained this reactive grouping are the alkyl or aryl derivatives of the ethylene oxides. The lower molecular weight compounds of this type, however, are relatively volatile and will not remain in the plastic compositions for sufficiently long periods of time, and the higher molecular weight compounds, while having a sufficiently low volatility and thermostabilizing efficiency, are readily decomposed or discolored by light.

It is therefore a principal object of the present invention to provide a method of stabilizing high molecular weight organic materials containing acid forming elements by the incorporation of stabilizing materials which impart to the compositions a high resistance to thermal decomposition that is maintained over a long period of time and which is comparable to or better than that obtained by the employment of white lead without any substantial decrease in the transparency of the composition. Another object is the provision of thermoplastic compositions in which the formation of inorganic acids by the decomposition of polymeric molecules has been inhibited by the incorporation of a light stable organic substance having a very high boiling point. Another object is the provision of a halogen containing vinyl resin composition containing a stabilizer which is an oil soluble, water insoluble organic composition boiling at least above 300° C. and which composition exhibits an increased resistance to the effects of heat and/or light and exhibits properties of electrical resistance equal to or greater than the inherent properties of the resin. Still other objects and advantages of the invention will be apparent from the following description.

We have now discovered that, contrary to the general rule (that the presence of a plurality of functional groups attached to a single molecule causes a decrease in the resistance of the molecule to photochemically induced decomposition or discoloration), certain high molecular weight organic compounds containing two or more epoxide groups and having the structure defined below surprisingly exhibit a greater stability than compounds of an identical structure, but containing a single epoxide group.

The present invention may therefore be generally stated as providing means of increasing both the thermal and photochemical stability of high molecular weight organic materials of the aforementioned type containing complex molecules to which are attached the residues of inorganic acids. The invention is particularly applicable for stabilization of organic material which contains halogen as a structural component and tends to release hydrogen halide with concurrent decomposition—e. g., polymers of vinyl halides. The inhibition of the heat and of the light induced deterioration of the organic materials is effected by incorporating and intimately admixing therewith about 0.2 to 5% by weight of an epoxyalkyl polyether of a polyhydric phenol, which polyether has a boiling point above 300° C. under normal pressure (760 mm. Hg), and which polyhydric phenol contains up to three phenolic hydroxyl groups and also contains, besides the elements in its hydroxyl groups, only atoms of carbon and hydrogen. The epoxide structure in the epoxyalkyl radicals of the polyether has the oxygen atom with its two bonds linked to different saturated carbon atoms which are vicinal carbon atoms and are thus linked directly together as is the case in the group

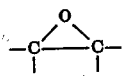

The epoxy structure can be in either terminal or interior location as present for example in a 2,3-epoxypropyl (glycidyl) radical or a 2,3-epoxybutyl radical, respectively. The number of these epoxy groups or epoxy oxygen atoms in a molecule of the polyether is greater than 1.0 in being a value between 1.0 and 3.0. With the simple polyethers, the number is the integer 2 or 3. Thus with 1,3-bis(2,3-epoxypropoxy)benzene and with 1,3,5-tris(3,4-epoxybutoxy)benzene, the number of epoxy oxygen atoms is 2.0 and 3.0, respectively, per molecule. With the complex polyethers which are a mixture of compounds of similar structure but somewhat different molecular weight, the measured molecular weight of the mixture is an average, and therefore, the calculated number of oxygen atoms in an average molecule will not necessarily be an integer, but in any case will be a value greater than 1.0. The polyhydric phenol from which the polyethers are derived contain two to three phenolic hydroxyl groups. These hydroxyl groups can be linked to separate carbon atoms of a single aromatic ring, to separate carbon atoms of different parts of condensed aromatic rings, or to separate carbon atoms of aromatic rings which are joined directly or by intervening aliphatic hydrocarbon radicals. In general, it is preferred to employ epoxyalkyl polyethers of dihydric phenols. The polyethers used as stabilizers in the compositions of the invention contain a plurality of up to three epoxyalkyl groups, each of which are joined to aromatic hydrocarbon radicals from the phenol by ethereal oxygen atoms. Accordingly, the stabilizer compounds have each of the oxygen atoms therein attached to two different atoms and are thus free of carbonyl groups with the result that they exhibit a pronounced resistance to photochemically induced decomposition and thereby provide an unusually marked stabilizing action for the organic material which contains halogen as a structural component and tends to release hydrogen halide with concurrent decomposition. Furthermore, the polyethers are substantially non-polar organic compounds of high molecular weight and thereby exhibit properties of electrical resistance equal to or greater than the organic material to be stabilized. Examples of simple epoxyalkyl polyethers of polyhydric phenols used in the compositions of the invention include: 1,3-bis(2,3-epoxypropoxy)benzene, 1,3-bis(3,4-epoxybutoxy)benzene, 1,3,5-tris(3,4-epoxybutoxy)benzene, 1,3-bis(3,4-epoxybutoxy)-5 - (2,3 - epoxypropoxy)benzene, 4,4' - bis(2,3-epoxypropoxy)diphenyl, 4,4' - bis(2,3 - epoxypropoxy)diphenyldimethylmethane and the like. These and similar compounds as well as more complex polyethers are obtainable by reaction of a monohaloepoxyalkane such as epichlorohydrin and a basic-reacting compound with such polyhydric phenols as resorcinol, catechol, 2,2-bis(4-hydroxyphenyl)propane (bisphenol), 4,4'-dihydroxydiphenyl, bis(2,2' - dihydroxydinaphthyl)methane, and the like.

The glycidyl polyethers of dihydric phenols constitute a preferred class of stabilizers. Both the simple and complex polyethers of this class are of the general formula

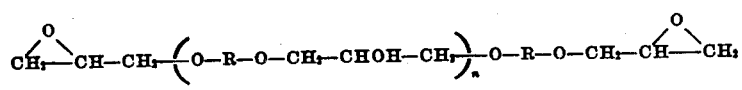

wherein $n$ is an integer, and R is a divalent aromatic hydrocarbon radical free of other atoms than carbon and hydrogen. The simple diethers wherein n is zero are obtained by use of a considerable excess of epichlorohydrin over the stoichiometric proportion of two mols of epichlorohydrin per mol of dihydric phenol. Use of lesser proportions of epichlorohydrin such as down to about 1.2 mols of epichlorohydrin per mol of dihydric phenol gives a product which is a mixture of complex polyethers. In being a mixture, the product does not have a measured value for $n$ which is an integer although the mixture of principal constituents have the above-noted formula wherein $n$ is an integer. For the ethers in general, $n$ usually has a value ranging from 0 to about 12 though it may be higher. A very suitable product is obtained from bisphenol and epichlorohydrin with use of an alkaline catalyst, which product has the formula

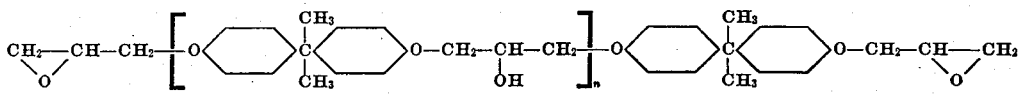

wherein $n$ represents an integer greater than one.

The preparation of a glycidyl polyether of a polyhydric phenol is illustrated by the preparation of resorcinyl bisglycidyl ether or 1,3-bis(2,3-epoxypropoxy)benzene.

In a reaction vessel equipped with a stirrer and a reflux condenser, one mol of resorcinol was dissolved in four mols of epichlorohydrin and the temperature of the solution raised to about 85° C. Sodium hydroxide (2 mols) was then introduced in the form of a 30% solution added dropwise over a period of 10 hours. The rate of adding the basic catalyst was such that the reaction solution remained acid to phenol phthalein throughout the addition.

The cooled reaction mixture was freed of precipitated sodium chloride, and the organic portion fractionally distilled. A yield of 0.7 mols (70%) of resorcinyl bisglycidyl ether was obtained in the form of a colorless, bright and viscous liquid, which after being left undisturbed for some time at room temperature slowly crystallized. The ether was readily soluble in various organic solvents, but practically insoluble in water, and had a melting point of from 33–36° C. and a boiling range of from 142–152° C. at 0.04 mm.

Since each glycidyl radical has an asymmetric carbon atom at least two diastereo isomers can be formed from each of the glycidyl polyethers. In the case of the diethers one of the isomers will be a racemic mixture or racemate of the optically active d,d- and 1,1- type, whereas the other isomer will be of the 1,d-type which is optically inactive. The physical properties of the diastereo isomers often are sufficiently different to allow their easy separation, (in the case of the resorcinyl bisglycidyl ether, the isomers boil at 143° C. and 151° C., respectively, at 0.04 mm. pressure); further, the solubility of the isomers in organic solvents often differs radically. In the case of the hydroquinyl bisglycidyl ether, while the lower boiling isomer is soluble in organic solvents the higher boiling isomer is practically insoluble. However, though the solubility is radically different, it was found isomers as stabilizers are substantially the same.

For applications in which the solubility of the stabilizer in the plasticizer is not of primary importance, as for example, in the preparation of opaque or colored solid compositions to be continuously exposed to relatively high temperatures, the polyepoxide polyethers having a polymeric structure are particularly suitable since they may be prepared to have a vapor pressure substantially as low as that of the plastic to be stabilized. A particularly suitable class of such ethers may be prepared by the reaction of a polyhydric phenol with an excess of a polyepoxide compound such as an epoxyalkyl polyether of a polyhydric phenol to produce a polyepoxy-polyhydroxy substance of a determinable molecular weight. The reaction of the polyhydric phenols and polyepoxy compounds can readily be accomplished by heating the reactants to-in each case tested that the efficiency of the gether for a short time. In general reaction temperatures of around 50–250° C. can be used. The temperature and time for any given reaction depend on the proportions and reactivity of the reactants and whether the reaction is to be carried to completion or to an intermediate stage. In some cases it is advantageous to add traces of basic catalyst such as caustic alkali to the mixtures of polyepoxide and polyhydric phenol, although in many, if not most cases, heat alone is sufficient to produce the required reaction.

The complex ethers may be incorporated into the composition by a wide variety of suitable procedures. They may be introduced as solutions or dispersions in one or more of the reactants prior to the polymerization of the polymer, or they may be introduced subsequent to the polymerization reaction by any of the procedures suitable for the dispersion or solution of an additive ingredient into a plastic composition.

The epoxyalkyl polyethers of the polyhydric phenols exhibit exceptional efficiency as stabilizers and therefore may be employed in comparatively small quantities in the compositions of the invention. The amount of the stabilizing agent most suitable for a particular application will be governed by many factors. In any case, a stabilizing amount which inhibits the thermo and photochemical deterioration is used, and this ordinarily amounts to about 0.2 to 5% by weight of the organic material being stabilized. The use of about 0.5 to 2% is usually adequate. Excellent results are obtained with 1, 2 and 3% by weight. If desired, amounts sufficient to have a plasticizing effect upon the organic material or polymer may be used such as up to 50 parts of the polyether per 100 parts of the organic material, the parts being by weight.

*Example I.—Comparative thermostabilization of polyvinyl chloride powders*

Samples of powdered Geon 101 (polyvinyl chloride) were prepared containing the designated amounts of the various stabilizers. The length of time required for the evolution of hydrogen chloride from the various samples when subjected to a temperature of 200° C. is listed in the following table:

| Stabilizer | | | Stability of powder at 200° C. in min. | Per cent of Stabilizer necessary to obtain stability for 16 mins. at 200° C. |
|---|---|---|---|---|
| Nature | Quantity per 100 g. P. V. C. | | | |
| | g. | g. eq. | | |
| None | 0.0 | 0.00 | 4 | |
| phenyl glycidyl ether | 1.0 | 0.007 | 8 | 3.0 |
| Do | 4.0 | 0.027 | 20½ | |
| alpha-naphthyl glycidyl ether | 2.0 | 0.010 | 14 | 2.4 |
| Do | 3.0 | 0.015 | 18 | |
| resorcinyl bisglycidyl ether | 1.0 | 0.009 | 11 | 1.7 |
| Do | 2.0 | 0.018 | 18 | |
| hydroquinyl bisglycidyl ether | 1.0 | 0.009 | 11 | 1.7 |
| Do | 2.0 | 0.018 | 18 | |
| alpha-phenyl indol | 2.0 | 0.010 | 5 | |
| thiourea | 2.0 | 0.052 | 5 | |
| diphenyl guanidine | 2.0 | 0.020 | 5 | |
| White lead | 2.0 | 0.007 | 16 | 2.0 |

Example II.—Comparative thermostabilization of polyvinyl chloride foils

Uniform foils 0.15 mm. thick were prepared under identical conditions differing from one to another only in the amount and type of stabilizer incorporated into the composition (each containing in addition to the stabilizer 100 parts by weight of Geon 101 and 50 parts by weight tricresyl phosphate and having been milled 3 minutes at 155° C.). The foils were supported in a carbon dioxide free air current while maintained at a temperature of 170° C. and the time in minutes required in each case to cause an evolution of hydrogen chloride is listed below:

| Polymer | Stabilizer | | | Initial HCl separation after— |
|---|---|---|---|---|
| | Nature | Quantity | | |
| | | g./100 g. P.V.C. | g. eq./100 g. P.V.C. | |
| | | | | Min. |
| Geon 101 | | | | 90 |
| Do | alpha-naphthyl glycidyl ether | 3.0 | 0.015 | 150 |
| Do | White lead | 3.0 | 0.022 | 205 |
| Do | resorcinyl bisglycidyl ether | 2.0 | 0.018 | 270 |

Example III.—Light stability of resorcinyl bisglycidyl ether and polyvinyl chloride foils containing it The light stability of resorcinyl bisglycidyl ether was found to be very good. Irradiation during a month with light produced by a Philips H. O. lamp did not affect the color of the product.

If subjected to this irradiation, a foil composed of polyvinyl chloride (2 parts by weight) and tricresyl phosphate (1 part by weight) shows distinct discoloration. The same foil containing 2% of resorcinyl bisglycidyl ether shows no discoloration under these conditions.

Example IV.—Color stabilization during high temperature processing by resorcinyl bisglycidyl ether Samples of polyvinyl chloride powder (Corvic standard) containing tricresyl phosphate as a plasticizer and differing only in the presence of resorcinyl glycidyl diethers as a stabilizer in the amounts indicated were pressed into 1.2 mm. sheets at the various temperatures. The colors of the sheets were measured by a Lovibond tintometer.

| Polymer | Quantity of Stabilizer calculated on P. V. C., per cent | Pressing temperature, °C. | Color expressed in units of the Lovibond scale | | |
|---|---|---|---|---|---|
| | | | Yellow | red | total |
| Corvic Standard | 0 | 130 | 2.0 | 0.7 | 2.7 |
| Do | 0 | 140 | 2.0 | 0.7 | 2.7 |
| Do | 0 | 150 | brown spots | | |
| Do | 0 | 160 | 11.0 | 14.0 | 25.0 |
| Do | 2 | 130 | 1.9 | 0.7 | 2.6 |
| Do | 2 | 140 | 2.0 | 0.7 | 2.7 |
| Do | 2 | 150 | 2.6 | 1.2 | 3.8 |
| Do | 2 | 160 | 3.6 | 1.6 | 5.2 |

Example V.—Comparative thermal stabilization of polyvinyl chloride compositions The compositions were prepared from the following recipe and differed only in the particular stabilizers employed:

| | Parts |
|---|---|
| Geon 101 (polyvinyl chloride) | 100 |
| Plasticizer (di-(2-ethylhexyl) phthalate) | 50 |
| Stabilizer | 2 |

The degree of discoloration upon aging is given in the following table in the form of extinction coefficients. This data may be considered relative and it should be remembered that the higher the value, the darker the sample. Samples with values above 10 are too dark to be measured accurately. Values on the commercial stabilizer marketed under the trade name V-1-N, which is described in "Modern Plastics Encyclopedia" (1947), as a "stabilizer for vinyl resins against discoloration" and is believed to be strontium stearate, have been included for comparison. The stabilizer denoted by letter A was the glycidyl polyether obtained by reacting bisphenol with epichlorohydrin as described hereinbefore with use of 2.04 mols of epichlorohydrin and 2.14 moles of sodium hydroxide per mol of bisphenol. The glycidyl polyether reaction product had the structure described hereinbefore with a value for $n$ of about 1.3 calculated on the measured molecular weight of 710 for the product. The compositions were compounded on a roll mill by milling for about 15 minutes at roll temperatures of 270 and 300° F.

| Time of Aging | A | V-1-N |
|---|---|---|
| EXTINCTION COEFFICIENT AFTER AIR AGING AT 160° C. | | |
| Control | 0.7 | 1.9 |
| 0.5 Hour | 1.3 | 2.1 |
| 1.0 Hour | 2.0 | 6.2 |
| 1.5 Hours | 8.7 | 10.5 |
| 2.0 Hours | 5.0 | 12.5 |
| 3.0 Hours | 6.5 | (1) |
| EXTINCTION COEFFICIENT AFTER AIR AGING AT 100° C. | | |
| 7 Days | 1.6 | 9.5 |
| 14 Days | 2.0 | 10.4 |
| EXTINCTION COEFFICIENT AFTER AGING IN U. V. LIGHT | | |
| 170 Hours | 0.6 | 1.1 |
| 340 Hours | 0.8 | 2 0.6 |
| SPECIFIC RESISTANCE, OHM. CM.×10^12 AT 25° C. | | |
| 1 Minute at 170° C | 40 | 3 |

1 Very dark.
2 Surface pitted.

*Example VI.—Comparative thermal stabilization of polyvinyl chloride sheets*

The stabilizing effect of 1,3-bis(2,3-epoxypropoxy)benzene (resorcinyl bisglycidyl diether) was compared with that of 4,4'bis(2,3-epoxypropoxy)benzophenone. Sheets of 1 millimeter thickness were prepared from compositions containing:

100 parts of polyvinyl chloride (Geon 101)
40 parts of di(2-ethylhexyl)phthalate
1.5 or 3.0 parts of the glycidyl ether Samples of the sheets were heated at 160° C. in an oven in air for the times indicated in the table below. The development of color in the samples was measured by comparison with the standard slides of the Lovibond tintometer.

| Stabilizer | Parts per 100 parts resin | Heating time (minutes) | | | |
|---|---|---|---|---|---|
| | | 15 | 30 | 45 | 60 |
| None | 0 | 6.0 | 23 | >30 | >30 |
| 1,3-bis (2,3-epoxypropoxy) benzene | 1.5 | 2.1 | 3.8 | 6.0 | 7.5 |
| Do | 3.0 | 1.7 | 2.5 | 4.0 | 4.7 |
| 4,4'-bis (2,3-epoxypropoxy) benzophenone | 1.5 | 18 | 25 | >30 | >30 |
| Do | 3.0 | 12 | 20 | >30 | >30 |

The foregoing results demonstrates that the glycidyl ether of the keto-containing polyhydric phenol, 4,4' - bis(2,3 - epoxypropoxy) - benzophenone, is inactive as a stabilizer. Furthermore, this ether was not compatible with the polyvinyl chloride because the sheets containing it were turbid. The sheets of the compositions of the invention containing the diglycidyl diether of resorcinol were clear and transparent which indicates complete compatibility of this ether.

This application is a continuation-in-part of our copending application, Serial No. 774,660, filed September 17, 1947.

We claim as our invention:

1. A composition of matter comprising organic material having a molecular weight of at least 162 which contains halogen as a structural component and tends to release hydrogen halide with concurrent decomposition in intimate admixture with from about 0.2 to 5% by weight of stabilizer therefor consisting essentially of an epoxyalkyl polyether of a polyhydric phenol, which polyether has a boiling point above 300° C. under normal atmospheric pressure, and which polyhydric phenol contains up to three phenolic hydroxyl groups and also contains, besides the elements in said hydroxyl groups, only atoms of carbon and hydrogen.

2. The composition as defined by claim 1 wherein the epoxyalkyl polyether is a glycidyl polyether of a dihydric phenol.

3. The composition as defined by claim 1 wherein the organic material is a polymer of a vinyl halide, and the epoxyalkyl polyether is a glycidyl polyether of a dihydric phenol.

4. A composition of matter comprising a polymer of a vinyl halide having a molecular weight of at least 162 in intimate admixture with from about 0.5 to 2% by weight of stabilizer therefor consisting essentially of a glycidyl polyether of a dihydric phenol, which polyether has a boiling point above 300° C. under normal atmospheric pressure, and which dihydric phenol contains, besides the elements in its two phenolic hydroxyl groups, only atoms of carbon and hydrogen.

5. A composition of matter comprising a polymer of a vinyl halide having a molecular weight above 162 in intimate admixture with from about 0.2 to 5% by weight of stabilizer therefore consisting essentially of glycidyl polyether of the formula.

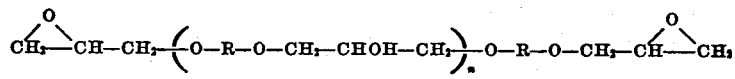

wherein $n$ is an integer and R is a divalent aromatic hydrocarbon radical free of other atoms than carbon and hydrogen.

6. A composition of matter comprising polyvinyl chloride having a molecular weight above 162 in intimate admixture with from about 0.2 to 5% by weight of stabilizer therefor consisting essentially of glycidyl polyether of the formula

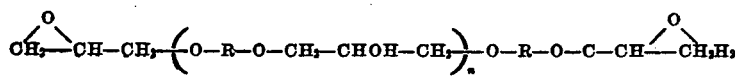

wherein $n$ is an integer and R is a divalent aromatic hydrocarbon radical free of other atoms than carbon and hydrogen.

7. A composition of matter comprising a polymer of vinyl chloride having a molecular weight of at least 162 in intimate admixture with from about 0.2 to 5% by weight of stabilizer therefor consisting essentially of glycidyl polyether of 4,4'-dihydroxydiphenyldimethylmethane.

8. A composition of matter comprising polyvinyl chloride having a molecular weight of at least 162 in intimate admixture with from about 0.5 to 2% by weight of stabilizer therefor consisting essentially of 4,4'-bis(2,3-epoxypropoxy)-diphenyldimethylmethane.

9. A composition of matter comprising a polymer of vinyl chloride having a molecular weight of at least 162 in intimate admixture with from about 0.2 to 5% by weight of stabilizer therefor consisting essentially of 1,3-bis(2,3-epoxypropoxy)benzene.

10. A composition of matter comprising polyvinyl chloride having a molecular weight of at least 162 in intimate admixture with from about 0.5 to 2% by weight of stabilizer therefor consisting essentially of 1,3-bis(2,3-epoxypropoxy)-benzene.

WILLEM LEENDERT JOHANNES DE NIE.
HEINO TONNIS VOORTHUIS.

No references cited.